(12) United States Patent
Eichberger

(10) Patent No.: US 6,467,177 B2
(45) Date of Patent: Oct. 22, 2002

(54) RECIPROCATING SAW BLADE CLAMP

(75) Inventor: Gert Eichberger, Schwalbach (DE)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/862,397

(22) Filed: May 22, 2001

(65) Prior Publication Data

US 2002/0026718 A1 Mar. 7, 2002

Related U.S. Application Data

(63) Continuation-in-part of application No. 09/347,329, filed on Jul. 2, 1999, now abandoned.

(30) Foreign Application Priority Data

Jul. 2, 1998 (DE) .......................... 198 31 222

(51) Int. Cl.⁷ .............................. B27B 19/02
(52) U.S. Cl. ........................... 30/392; 279/77
(58) Field of Search .................. 30/329, 337, 392; 83/699.21; 379/77

(56) References Cited

U.S. PATENT DOCUMENTS

| | | | |
|---|---|---|---|
| 4,351,112 A | 9/1982 | Nalley | 30/392 |
| 4,648,182 A | 3/1987 | Hoffman | 30/392 |
| 5,322,302 A | 6/1994 | Quirijnen | 279/77 |
| 5,433,493 A | * 7/1995 | Dix et al. | 294/104 |
| 5,443,276 A | 8/1995 | Nasser et al. | 30/392 |
| 5,722,309 A | 3/1998 | Seyerle | 83/699.21 |
| 5,987,758 A | 11/1999 | McCurry et al. | 30/392 |

FOREIGN PATENT DOCUMENTS

| | | |
|---|---|---|
| DE | 1688947 | 12/1954 |
| DE | 7504897 | 2/1975 |
| DE | 4138986 | 6/1993 |
| DE | 19521762 | 10/1996 |

* cited by examiner

Primary Examiner—Hwei-Siu Payer
(74) Attorney, Agent, or Firm—Michael P. Leary; Bruce S. Shapiro

(57) ABSTRACT

A reciprocating saw, such as a compass (jigsaw) saw or similar saw, has a blade clamp for securely clamping blades having different dimensions. The clamp has a blade seat with bearing surfaces for at least two adjacent, axially extending surfaces of the saw blade shank, and a stop surface for the rear end of the blade shank. A hand-operable clamping element is mounted on the blade seat and is pivotal about an axis between a releasing position and a clamping position. A spiral clamping surface is formed on the clamping element and has a constant opening angle. Through the use of a spiral clamping element with a constant opening angle, the clamping element maintains the same clamping angle with saw blade shanks of varying dimensions.

20 Claims, 4 Drawing Sheets

RECIPROCATING SAW BLADE CLAMP

This application is a Continuation-in-Part of U.S. application Ser. No. 09/347,329, filed on Jul. 2, 1999 now abandoned.

BACKGROUND OF INVENTION

The invention relates to a reciprocating saw, such as a compass (jigsaw) saw or similar saw, and more particularly, relates to a clamp for a blade used in such saws.

In one prior art blade clamp for saws of this type disclosed in U.S. Pat. No. 5,443,276 and EP 0 693 341 A1, the clamping element has a clamping surface which is in the form of a partial cylinder, that is, is curved in a circular arc shape, the clamping element being rotatable about an axis that is offset with respect to the axis of the cylinder. In this way, by rotating the clamping element by means of an externally accessible operating member, the circular arc-shaped clamping surface can be moved between a position in which it is in clamped engagement with a main lateral surface of the saw blade shank, and a released position, in which it is disengaged from the main lateral surface of the saw blade.

This form of the clamping surface is suitable for clamping the saw blade when the dimensions of the saw blade shank vary only within very narrow limits, and when the form and position of the clamping surface remain substantially unchanged throughout the life of the saw blade clamp. Otherwise, a satisfactory clamping action cannot be obtained, or alternatively the clamped engagement can be so tight that the user is not, or only with considerable difficulty, able to move the clamping element into the release position.

BRIEF DESCRIPTION OF INVENTION

An object of the present invention is to provide a saw with an improved saw blade clamp for clamping saw blade shanks of different dimensions, while keeping a clamping force of unvarying magnitude.

According to one aspect of the present invention, a reciprocating saw comprises a housing with a drive train including a motor, a gear train and a reciprocally drivable output shaft. A saw blade clamp is connected to the output shaft for holding a shank of a blade. The clamp comprises a blade seat with an opening for receiving the blade shank. A hand operable clamping element is pivotal relative to the blade seat about an axis between a releasing position and a clamping position. A spiral clamping surface is formed on the element, extends around the axis for engagement with the third axially extending surface of the saw blade shank and the spiral clamping surface has a constant opening angle.

By using a spiral clamping surface with a constant opening angle, an effective and manageable clamping force is exerted on the shank of the clamped saw blade. For all shank dimensions that lie within the prescribed size range, in the clamping position of the clamping element, the same clamping angle or angle of engagement is obtained between straight lines running through the axis of rotation of the clamping element. One line runs perpendicular to the shank surface at which clamping takes place. The other line extends through the point of contact between spiral clamping surface and the shank surface. The included angle is the clamping angle and it is the same angle for blade shanks of different thicknesses. Having the same clamping angle for all cases ensures that the same clamping force is exerted in each case.

The opening angle of the spiral surface should be chosen to produce a clamping angle of between 4° and 12° when holding blade shanks of the expected thicknesses. The clamping angle is preferably between 8° to 11° and most desirably about 10°. If the clamping angle is less than 4°, clamping can be such that the user would be virtually unable to release it. If the clamping angle is more than 12°, there is a risk that the engagement between clamping surface and saw blade shank will not be effective. The clamping surface may simply slide along the saw blade shank as the clamping element is rotated without producing an effective clamping force.

The preferred configuration of the blade includes a blade shank having at least three axially extending surfaces and rear end. The seat preferably comprises (a) at least two bearing surfaces adjacent to two of the axially extending surfaces and (b) a stop surface for the rear end.

The clamping element is preferably in the form of a two-armed lever. The clamping surface is formed on one of the arms. An operating arm for manually displacing the clamping element is formed on the other arm.

In an especially preferred practical form, the clamping surface engages a narrow side of the inserted saw blade shank. At the same time, it has been shown that saw blade shanks of a width between 5.8 mm and 7.2 mm can be clamped properly and uniformly without difficulty by means of the spiral clamping element constructed according to the invention.

When the clamped engagement is effected at the narrow side of the inserted saw blade shank, it is advantageous to mold a groove of constant depth into the clamping surface to engage the saw blade shank. With a constant depth of the groove, the effective form of the spiral is not changed, yet the groove provides additional positioning of the saw blade in the clamped state.

The bearing surfaces of the blade seat preferably form part of a receiving slot open towards the side of the clamping surface.

The clamping element can be spring-loaded towards the clamping position, so that when released it will always be urged into this clamping position, thus ensuring a stable operating state. The spring force acts to increase the clamping force. But in relation to the clamping force effective in operation, the increase in clamping force is so small that it does not appreciably influence the clamping force. On the contrary, the clamping force is caused in practice only by the engagement between the spiral clamping surface and the shank of the saw blade, and by the tensile force that acts on the saw blade in operation.

According to a second aspect of the present invention, a saw blade clamp for a reciprocating saw comprises a clamp as described in accordance with the first aspect of the invention.

BRIEF DESCRIPTION OF THE DRAWINGS

The invention is explained in detail in the following with reference to the Figures showing an exemplary embodiment.

DETAILED DESCRIPTION OF THE DRAWINGS AND EMBODIMENTS

A preferred embodiment of the present invention is a reciprocating saw commonly known as a compass or jig saw as is shown in FIGS. 1–4. The present invention can also be used with other types of reciprocating saws.

Figure 1:
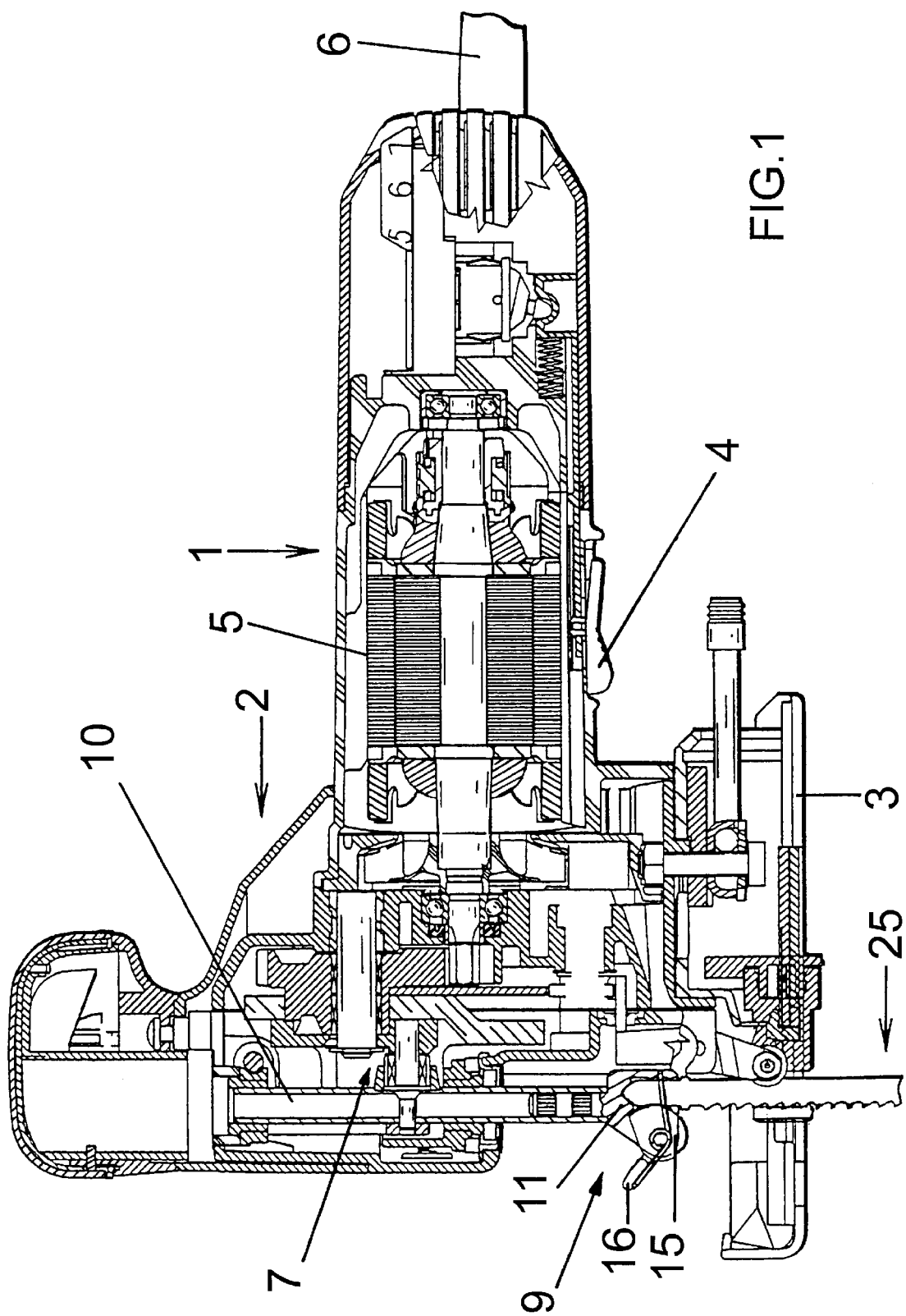
FIG. 1 shows, in section, an electric tool in the form of a compass saw.
Figure 2:
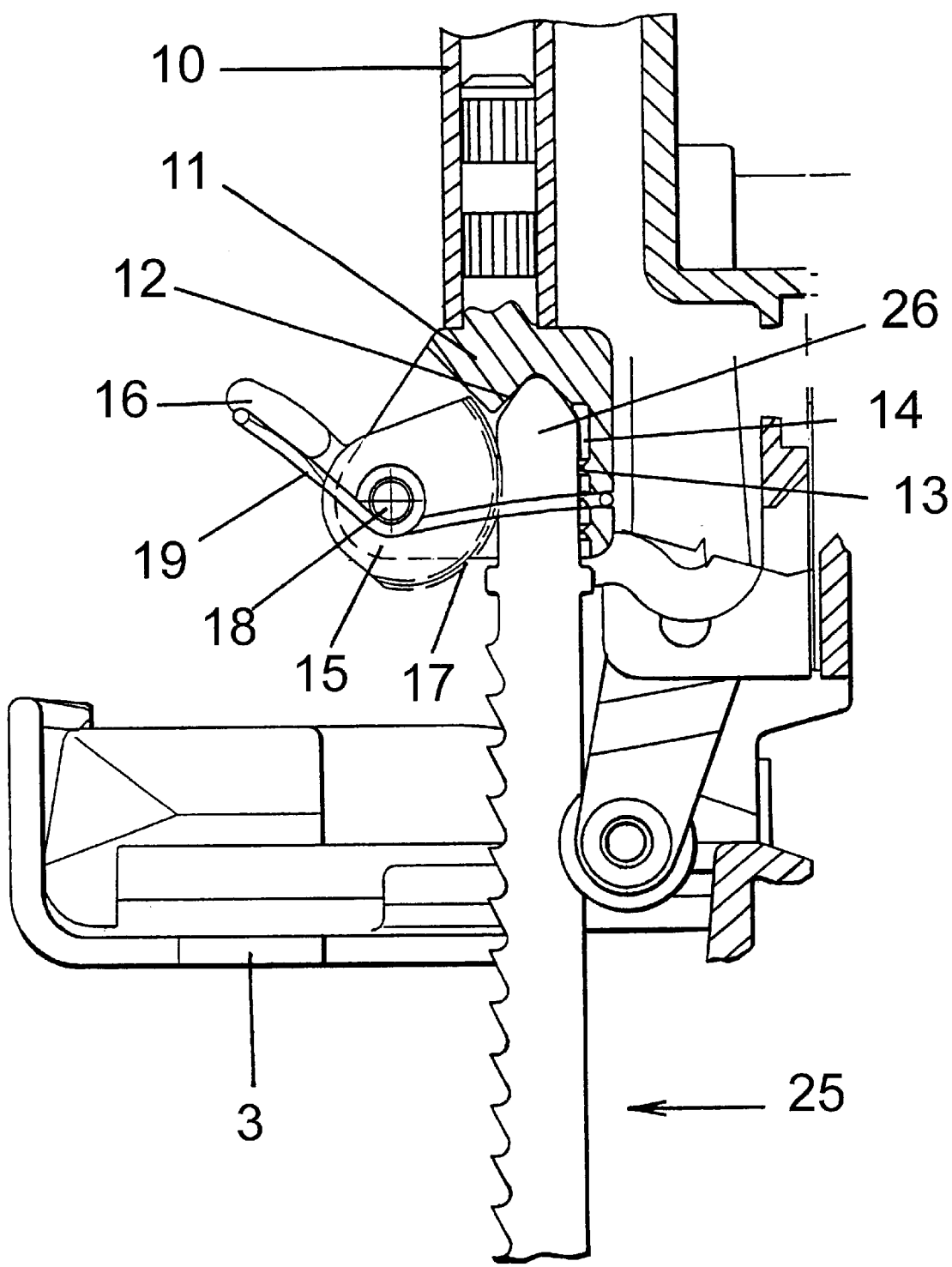
FIG. 2 shows, in a partial view, the region of the saw blade clamp of the compass saw from FIG. 1.

As shown in FIG. 1, the saw includes a motor housing 1 forming part of the compass saw housing. The compass saw is preferably electrically operated and contains an electric motor 5 connected to a voltage source by means of an operating switch 4. The compass saw is connected to the voltage source via a cable led out of the compass saw through a protective sleeve 6 at the rear end thereof. The electric motor 5 drives in the customary manner a gear train 7 provided in a section of the compass saw housing forming the gear housing 2. The gear train 7 is of the customary construction for compass saws and is used to move back and forth the customary plunger or output shaft 10. A saw blade clamp 9 is mounted at the lower end of shaft 10. Secured to the underside of the compass saw housing is a customary shoe 3. A saw blade 25 inserted into the saw blade clamp extends through shoe 3. The overall construction of this compass saw is standard and consequently need not described in further detail.

The blade clamp 9 comprises a blade seat 11 inserted in the lower end of the plunger 10. For mounting in the shaft, the blade seat has a corrugated or knurled shank that is pressed into the lower end of the tubular plunger 10. The blade seat 11 is locked to prevent turning and is axially immovable in the plunger 10.

The blade seat 11 has a slot-shaped shank seat open in a downward direction. The shank seat has two opposing bearing surfaces, only the rear bearing surface 14 of which is shown in the Figures, whilst the opposing bearing surface is not illustrated in the Figures. These bearing surfaces are joined at the right-hand side in FIGS. 1 and 2 by a bearing surface 13. The bearing surface 14 and the bearing surface running parallel thereto, not illustrated, do not extend as far as the edge on the left-hand side in FIGS. 1 and 2 of the shank 26 of the compass saw blade 25. At the top end of the receiving slot formed, there is an approximately V-shaped bearing surface 12, with which the rear end of the shank 26 of the inserted compass saw blade 25 comes into supportive engagement.

Figure 5:
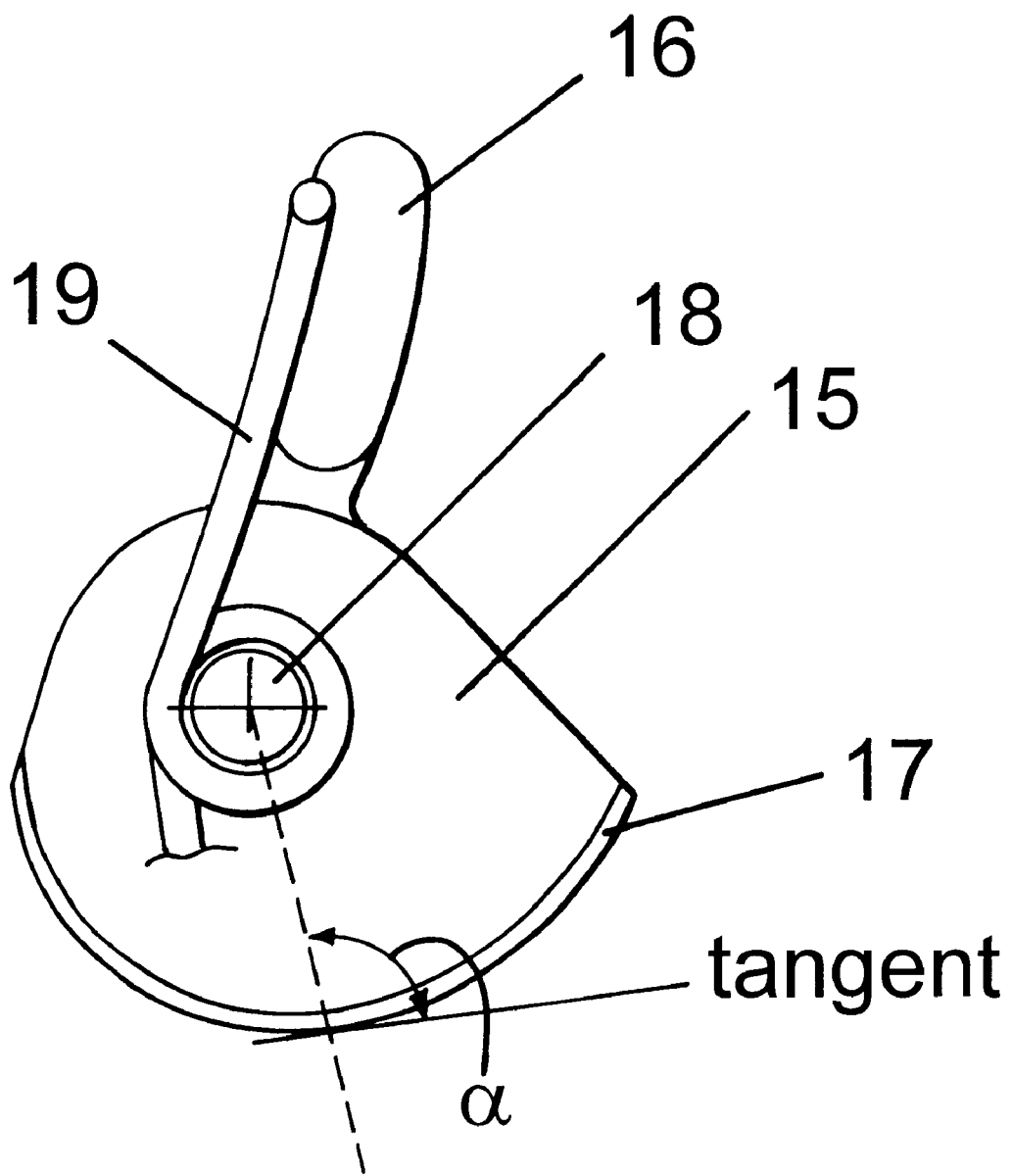
FIG. 5 shows a side view of the clamping element of FIG. 2 in isolation.

On the side lying opposite the bearing surface 13, a clamping element 15 is fastened to the blade seat 11 and has an operating arm 16. This is arranged to pivot about an axis formed by a pivot pin 18, and has a spiral clamping surface 17 which faces the edge or narrow side of the shank 26 of the compass saw blade 25 on the left in the FIGS. 1 and 2. As shown in FIG. 5, the spiral clamping surface 17 is in the form of an equiangular or logarithmic spiral wherein the spiral intersects its own radii everywhere at the same angle, but other than 90° (which would be circle), which angle is referred to as the opening angle α. The distance r of the clamping surface from the axis of rotation of the clamping element 15 follows the mathematical definition of a spiral, taking into account the geometric attributes in the region of the blade clamp and taking into account the widths of shanks 26 of compass saw blades to be clamped, namely:

$$r(\varphi) = \frac{B\left(-\frac{d_o}{B}\right)}{\cos\left(\frac{\alpha\pi}{180°}\right)} \cdot e^{2\pi \tan(*)}$$

in which $$(*) = \left(\frac{\alpha\pi}{180°}\right) \cdot \left(\frac{\varphi - \alpha}{360°} - n\right)$$

and

B is the distance between axis of rotation and bearing surface 13,

α is the opening angle of the spiral, $d_o$ is the largest shank width to be clamped, n is the number of revolutions (here=0) and Φ is the variable angle, which at the same time specifies the angular dimension of the part of the spiral useable as clamping surface.

Figure 3:
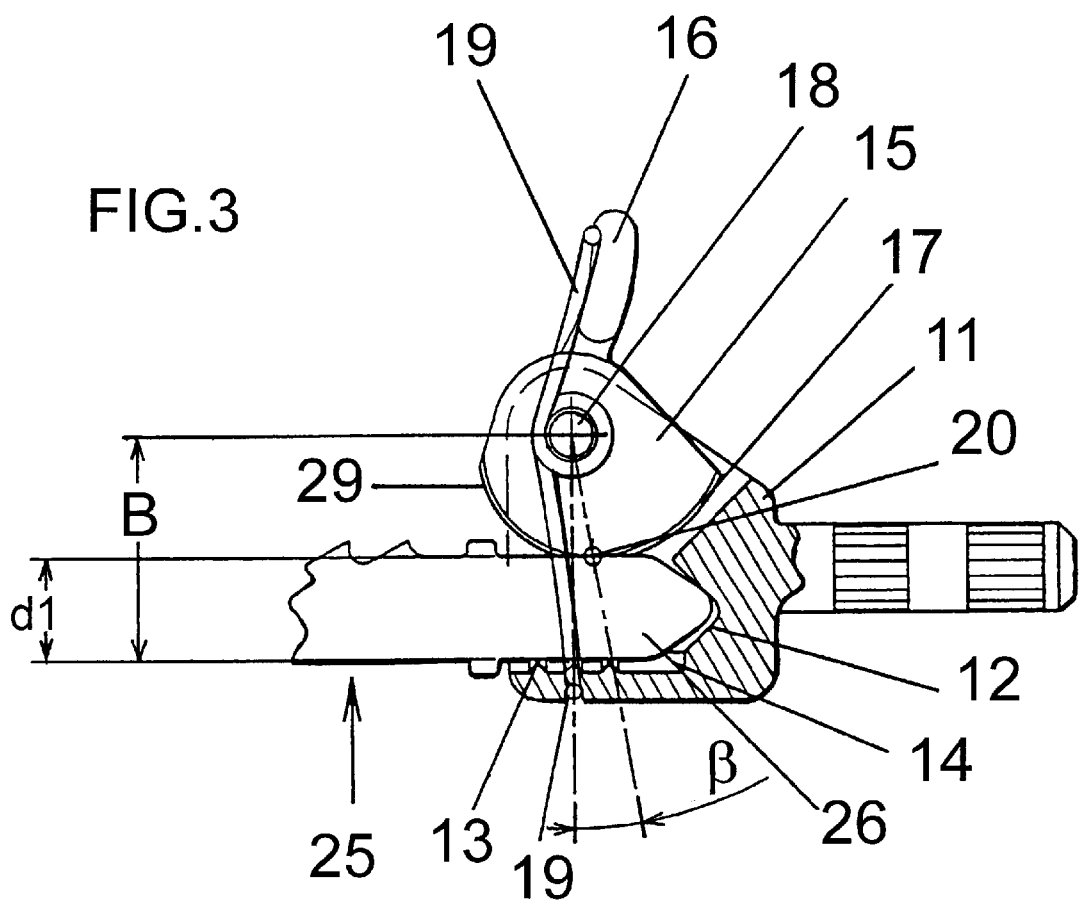
FIG. 3 shows, in a diagrammatic partial view, the saw blade clamp with the saw blade inserted.
Figure 4:
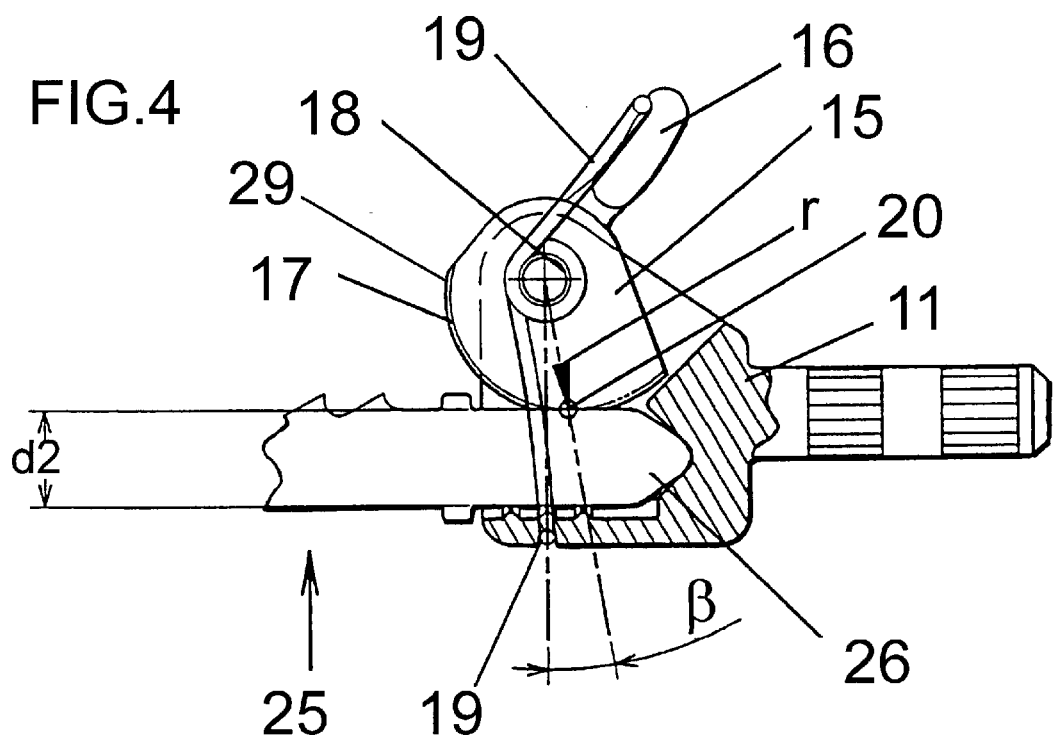
FIG. 4 shows, in a view corresponding to FIG. 3, the saw blade clamp with an inserted saw blade, the shank of which has a smaller width than the shank of the saw blade from FIG. 3.

If the shank 26 of a compass saw blade 25 has been inserted into the saw blade clamp and the spiral clamping surface 17 has been brought into engagement with the narrow side of the shank 26, then, as shown especially in FIGS. 3 and 4, a contact point 20 is obtained between the clamping surface 17 and the narrow side of the shank 26. For all shank widths provided, this contact point 20 lies on a straight line running through the axis of rotation 18. This straight line forms, with a straight line through this axis of rotation running perpendicular to the bearing surface 13 and to the narrow side of the shank 26 of the compass saw blade 25 remote from the clamping surface 17, the same angle, namely the clamping angle β. To that end, in FIGS. 3 and 4 different shank widths are indicated, namely, in FIG. 3 a relatively large shank width $d_1$, which is, for example, 7 mm, and in FIG. 4 a smaller shank width $d_2$, which can be, for example, 6.4 mm. In both cases, the same clamping angle β is obtained, which in the case illustrated is 10°. The same clamping conditions consequently apply for all shank widths provided.

As illustrated, a spring 19, which is supported at its other end at the blade seat 11, bears against the operating arm 16 of clamping element 15. Spring 19 urges the clamping element 15 towards the clamping position illustrated in the Figures. To open the saw blade clamp, the user therefore displaces the operating arm 16 against the force of the spring 19, anti-clockwise in the Figures to move the clamping surface 17 away from the narrow side of the shank 26. And the blade can then be removed from the blade clamp. If the operating arm 16 is released after another compass saw blade has been inserted, the spring 19 causes the clamping element 15 to pivot clockwise (in the Figures), and the clamping surface 17 is brought into the illustrated engagement with the narrow side of the shank of the inserted compass saw blade.

To prevent the saw blade 25 from being tilted out of true under the action of the clamping surface 17, a groove 29 is formed in the region of the clamping surface 17. The groove 29 has a uniform depth over the extent of the spiral clamping surface and engages around the narrow side of the shank 26 of the inserted compass saw blade 25 approximately laterally, so that the compass saw blade is secured against tilting.

The invention has been explained by reference to a preferred embodiment of a reciprocating saw and blade clamp. Those skilled in the art will appreciate that various modifications and variations can be made in a saw and clamp according the present invention without departing from the spirit and scope the invention. Thus it is intended that the present invention covers all such modifications and variations provided they come within the scope of the appended claims and their equivalents.

I claim:

1. A reciprocating saw comprising:
    a housing;
    a motor in the housing;
    a gear train in the housing, the gear train connected to and driven by the motor;
    an output shaft in the housing, the shaft connected to and reciprocally drivable by the gear train;
    a saw blade clamp connected to the output shaft for holding a blade;
    the blade having a shank;
    the clamp comprising:
        a blade seat having an opening for receiving the blade shank;
        a hand operable clamping element pivotal relative to the blade seat about an axis between a releasing position and a clamping position; and
        a spiral clamping surface formed on the clamping element and having a constant opening angle.

2. The saw of claim 1 wherein:
    the blade shank has at least three axially extending surfaces and a rear end;
    the blade seat comprises at least two bearing surfaces adjacent to two of the axially extending surfaces and a stop surface for the rear end; and
    the clamping surface engages the third axially extending surface of the blade shank.

3. The saw of claim 2, wherein the third surface of the blade shank is a narrow side of the blade shank.

4. The saw of claim 2, wherein the clamping surface comprises a groove of constant depth for engaging the third surface of the blade shank.

5. The saw of claim 2, wherein the bearing surfaces are part of a receiving slot open towards the side of the clamping surface.

6. The saw of claim 1 wherein the spiral clamping surface engages the blade shank with a clamping angle in the range between approximately 4° and 12°.

7. The saw of claim 6, wherein the clamping angle is between approximately 8° and 11°.

8. The saw of claim 6 wherein the clamping angle is approximately 10°.

9. The saw of claim 1, wherein the clamping element is a two-armed lever including a first arm and a second arm, the spiral clamping surface is formed on said first arm and the second arm being an operating arm.

10. The saw of claim 1, wherein the clamping element is spring-loaded in the direction of the clamping position.

11. A blade clamp for a reciprocating saw comprising:
    a blade seat having an opening for receiving a shank of a blade;
    a hand operable clamping element pivotal relative to the blade seat about an axis between a releasing position and a clamping position; and
    a spiral clamping surface formed on the clamping element and having a constant opening angle.

12. The blade clamp of claim 11 wherein
    the blade shank has at least three axially extending surfaces and a rear end;
    the blade seat comprises at least two bearing surfaces adjacent to two of the axially extending surfaces and a stop surface for the rear end; and
    the clamping surface engages the third axially extending surface of the blade shank 13. The blade clamp of claim 12, wherein the third surface of the blade shank is a narrow side of the blade shank.

14. The blade clamp of claim 12, wherein the clamping surface comprises a groove of constant depth for engaging the third surface of the blade shank.

15. The blade clamp of claim 12, wherein the bearing surfaces are part of a receiving slot open towards the side of the clamping surface.

16. The blade clamp of claim 12, wherein the clamping element is spring-loaded in the direction of the clamping position.

17. The blade clamp of claim 11 wherein the spiral clamping surface engages the blade shank with a clamping angle in the range between approximately 4° and 12°.

18. The blade clamp of claim 17, wherein the clamping angle is between approximately 8° and 11°.

19. The blade clamp of claim 17, wherein the clamping angle is approximately 10°.

20. The blade clamp of claim 11, wherein the clamping element is a two-armed lever including a first arm and a second arm, the spiral clamping surface is formed on said first arm and the second arm being an operating arm.

* * * * *